(12) United States Patent
Posamentier

(10) Patent No.: US 7,970,509 B2
(45) Date of Patent: Jun. 28, 2011

(54) COMPONENT IDENTIFICATION SYSTEM AND METHOD THEREOF

(75) Inventor: Joshua Posamentier, Oakland, CA (US)

(73) Assignee: Intel Corporation, Santa Clara, CA (US)

( * ) Notice: Subject to any disclaimer, the term of this patent is extended or adjusted under 35 U.S.C. 154(b) by 851 days.

(21) Appl. No.: 11/853,526

(22) Filed: Sep. 11, 2007

(65) Prior Publication Data

US 2009/0069970 A1    Mar. 12, 2009

(51) Int. Cl.
*H04Q 5/22* (2006.01)
*G01C 21/26* (2006.01)
*G06F 19/00* (2006.01)

(52) U.S. Cl. ............ 701/29; 701/2; 701/35; 340/825.49

(58) Field of Classification Search .................... 701/29, 701/35, 33, 2; 705/28; 235/385; 340/539.13, 340/825.49
See application file for complete search history.

(56) References Cited

U.S. PATENT DOCUMENTS

| | | | | |
|---|---|---|---|---|
| 6,107,917 | A * | 8/2000 | Carrender et al. | 340/505 |
| 6,112,152 | A * | 8/2000 | Tuttle | 701/115 |
| 6,208,910 | B1 * | 3/2001 | Michael et al. | 700/225 |
| 6,671,646 | B2 * | 12/2003 | Manegold et al. | 702/127 |
| 6,747,560 | B2 * | 6/2004 | Stevens, III | 340/572.4 |
| 7,047,159 | B2 * | 5/2006 | Muehl et al. | 702/184 |
| 7,356,394 | B2 * | 4/2008 | Burgess | 701/33 |
| 2002/0057208 | A1 * | 5/2002 | Lin et al. | 340/825.49 |

* cited by examiner

*Primary Examiner* — Tan Q Nguyen
(74) *Attorney, Agent, or Firm* — Grossman, Tucker, Perreault & Pfleger PLLC

(57) ABSTRACT

Disclosed are a system and a method for identifying components in an assembly. The system comprises an assembly including one or more components and a power harvesting device, and a reader. The power harvesting device provides power to the one or more components and queries component identification information from the one or more components. The one or more components provide the power harvesting device with the component identification information which is relayed to the reader by the power harvesting device. The system allows determination of the components of the assembly while precluding the need for dismantling the assembly or powering on the assembly to run diagnostic software.

12 Claims, 2 Drawing Sheets

# COMPONENT IDENTIFICATION SYSTEM AND METHOD THEREOF

FIELD

The present disclosure generally relates to hardware inventory management and, more particularly, to a system and a method for identifying components in an assembly without a need to dismantle the assembly or perform any diagnostic operations.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE DISCLOSURE

For a thorough understanding of the present disclosure, refer to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present disclosure. Also, it is to be understood that the phraseology and terminology used herein is for the purpose of description and should not be regarded as limiting. The terms "a" and "an" herein do not denote a limitation of quantity, but rather denote the presence of at least one of the referenced item.

The present disclosure provides a component identification system and a method for identifying components in an assembly that precludes the need for dismantling the assembly or powering on the assembly for running diagnostic software. The system comprises an assembly and a reader. The assembly comprises one or more components and a power harvesting device. The power harvesting device provides power to the one or more components and queries component identification information from the one or more components. As used herein, the component identification information is any information capable of assisting in determining the components of the system. The one or more components provide the power harvesting device with the component identification information which is then relayed to the reader by the power harvesting device. The one or more components in the assembly are thus identified using the component identification system.

Figure 1:
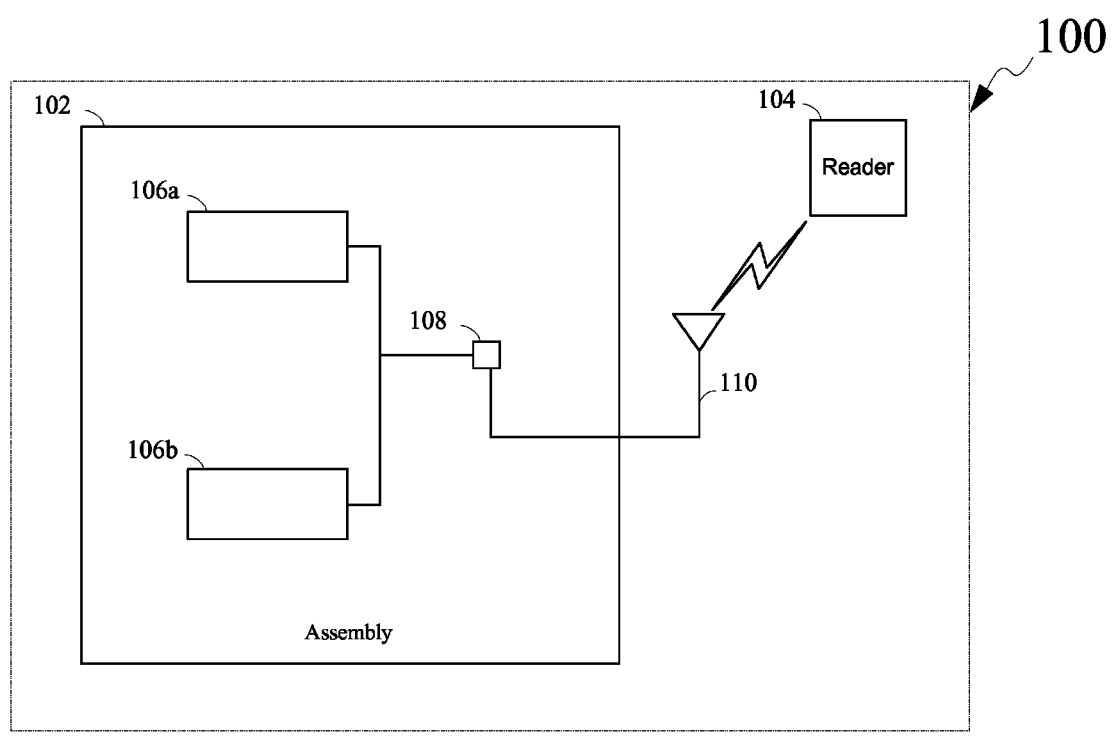
FIG. 1 is a block diagram of a component identification system, in accordance with an embodiment of the present disclosure.

FIG. 1 is a block diagram of a component identification system 100 in accordance with an embodiment of the present disclosure. The component identification system 100 comprises an assembly 102 and a reader 104. The assembly 102 comprises at least one component such as a component 106a and a component 106b, and a power harvesting device 108. The components such as the component 106a and the component 106b will hereinafter be referred to collectively as components 106. The power harvesting device 108 is capable of operably communicating with the components 106 and the reader 104. Examples of the assembly 102 may include electronic devices such as personal computers (PC), laptops, Personal Digital Assistants (PDAs), and the like. Examples of the components such as component 106a may include but are not limited to a hard disk, a disk drive, a video card, a motherboard, a central processing unit and a Dual In-line Memory Modules (DIMMs). Examples of the reader 104 may include a Radio Frequency Identification (RFID) reader and such other devices capable of querying component identification information from the power harvesting device 108 and receiving the component identification information. The power harvesting device 108 may communicate with the components 106 using a trace, a wire, a cable or any such wired connection.

The power harvesting device 108 includes an antenna 110 for communicating with the reader 104. As shown in FIG. 1, the antenna 110 of the power harvesting device 108 may be mounted external to the assembly 102. Alternatively, the antenna 110 may be housed inside the assembly. Examples of power harvesting device 108 may include a power harvesting RFID tag and such other devices capable of harvesting power.

The power harvesting device 108 stores energy collected from ambient radiation sources and uses the energy to power the components 106. Typically, the reader 104 sends an unmodulated carrier signal and the power harvesting device 108 harvests the power contained in that unmodulated carrier signal. The unmodulated carrier signal is received at the antenna 110 of the power harvesting device 108. The power harvested from the unmodulated carrier signal is used to power the components 106. The power harvesting device 108 uses the power to activate the components 106 from a sleep mode and query the component identification information from the components 106. The components 106 switch to an ON mode on receiving the power from the power harvesting device 108 and provide the component identification information to the power harvesting device 108. The component identification information may include details of the type and make of the components 106, component model ID, firmware revision and the like. In one embodiment of the present disclosure, the reader 104 may inquire the component identification information with the power harvesting device 108. Based on the instruction, the power harvesting device 108 may power the components 106 and query the component identification information from the components 106. The component identification system 100 thus helps in determining the components 106 in the assembly 102 without the need to dismantle the assembly 102 or the need to run any diagnostic software for determining the components 106. The component identification system is also referred to as a passive wireless backscatter system as the power harvesting device 108 receives a signal from the reader 104 and provides the component identification information back to the reader 104 wirelessly with minimal consumption of power.

Figure 2:
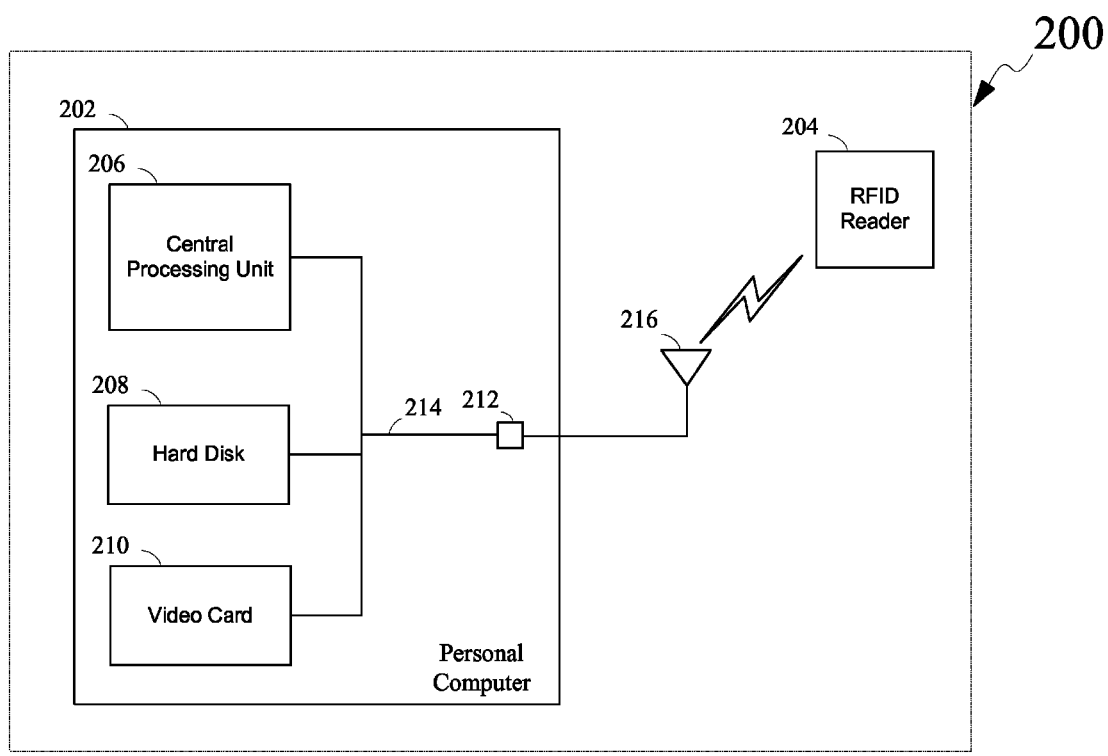
FIG. 2 is a block diagram of an exemplary component identification system, in accordance with an embodiment of the present disclosure.

FIG. 2 is a block diagram of an exemplary component identification system 200, in accordance with an embodiment of the present disclosure. The exemplary component identification system 200 includes a personal computer 202 (such as the assembly 102 explained in conjunction with FIG. 1) and a RFID reader 204 (such as the reader 104). The personal computer 202 includes a central processing unit 206, a hard disk 208 and a video card 210 (such as the component 106a)

and a power harvesting RFID tag 212 (such as the power harvesting device 108). The power harvesting RFID tag 212 (hereinafter referred to as RFID tag 212) is capable of operably communicating with the central processing unit 206, the hard disk 208 and the video card 210 using a low power two-wire bus 214. The low power two-wire bus 214 is used by the RFID tag 212 to activate the central processing unit 206, the hard disk 208 and the video card 210, and query component identification information. Further, the low power two-wire bus 214 provides two way communication between the RFID tag 212 and the central processing unit 206, the hard disk 208 and the video card 210 by serving as a means for transfer of the component identification information from the central processing unit 206, the hard disk 208 and the video card 210 to the RFID tag 212 at low speeds and with minimal power consumption. The RFID tag 212 may be attached to a motherboard of the central processing unit 206 and further includes an antenna 216 mounted external to the personal computer 202. The RFID tag 212 communicates with the RFID reader 204 using the antenna 216.

The RFID reader 204 transmits an unmodulated carrier signal to the RFID tag 212, which receives the unmodulated carrier signal using the antenna 216 and harvests power from the unmodulated carrier signal. The power harvested is used to activate the central processing unit 206, the hard disk 208 and the video card 210, and query information such as the model make, model ID and firmware revisions. The central processing unit 206, the hard disk 208 and the video card 210 provide the information to the RFID tag 212 using the low power two wire bus 214. The RFID tag 212 then relays the information to the RFID reader 204 using the antenna 216. The exemplary component identification system thus may be used to identify the components inside the personal computer 202 without the need to dismantle the computer 202 or running any diagnostic software to determine the components. The component identification system 100 may thus preclude the need to activate the power on the personal computer 202 or any such assembly before determining its components. The component identification system 100 may thus be used to inventory the assembly components, or for a hardware manufacturer to manage the components.

It will be evident to a person skilled in the art that the RFID reader 204 may include a transmitter circuit and a receiver circuit for communicating with the RFID tag 212. The RFID reader 204 may include a processor for processing the information received from the RFID tag 212.

The identification of the components of the assembly may also be explained by the following method. The method for determining the components may include providing a source of power to a power harvesting device, such as the power harvesting device 108, for powering up one or more components (such as the components 106) of an assembly (such as the assembly 102) and querying component identification information from the one or more components. The one or more components, upon powering ON, provide the component identification information to the power harvesting device. The component identification information includes details of the components, such as component model make, component model ID and the like. The power harvesting device provides the component identification information to a reader such as reader 104 for further processing. The method for determining components of an assembly thus precludes the need for dismantling the assembly or powering on the assembly to run diagnostic software.

Further, the component identification system may be configured using a central Information Technology (IT) policy. The component identification system may be used at security check-ins, badge-reading portals and such other premises for determining components and preventing alarm situations. The component identification system may further be used to non-invasively inventory components inside shielded electronic equipments and luggage cases without causing any inconvenience to their owners.

The foregoing descriptions of specific embodiments of the present disclosure have been presented for purposes of illustration and description. They are not intended to be exhaustive or to limit the disclosure to the precise forms disclosed, and obviously many modifications and variations are possible in light of the above teaching. The embodiments were chosen and described in order to best explain the principles of the disclosure and its practical application, to thereby enable others skilled in the art to best utilize the disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A component identification system comprising:
    an assembly, the assembly comprising at least one component and a power harvesting device, the power harvesting device configured to operatively communicate with the at least one component; and
    a reader, the reader in operative communication with the power harvesting device;
    wherein the power harvesting device is configured to power the at least one component to query the at least one component for component identification information related to the at least one component; and
    wherein the power harvesting device is further configured to provide the component identification information received from the at least one component to the reader.

2. The component identification system of claim 1, wherein the power harvesting device is a power harvesting Radio Frequency Identification (RFID) tag.

3. The component identification system of claim 1, wherein the reader is an RFID reader.

4. The component identification system of claim 1, wherein the power harvesting device powers the at least one component and queries the at least one component for the component identification information based on an instruction received from the reader.

5. The component identification system of claim 1, wherein the power harvesting device in the assembly is coupled to an antenna for providing the component identification information from the at least one component to the reader.

6. The component identification system of claim 1, wherein the component identification information from the at least one component in the assembly comprises at least one of a unit level identification, a unit model and a firmware revision.

7. A system for determining components in an assembly, the system comprising:
    a power harvesting device, the power harvesting device housed in the assembly and configured to operatively communicate with at least one component in the assembly; and
    a reader, the reader in operative communication with the power harvesting device;
    wherein the powering harvesting device is configured to power the at least one component to query the at least one component for a component identification information related to the at least one component; and wherein the power harvesting device is further configured to provide the component identification information received from the at least one component to the reader.

8. A method for determining components in an assembly, the method comprising:

powering at least one component in the assembly, wherein a power harvesting device housed in the assembly powers the at least one component in the assembly;

querying the at least one component in the assembly for component identification information related to the at least one component, wherein the power harvesting device queries the at least one component in the assembly for the component identification information; and providing the component identification information received by the power harvesting device to a reader.

9. The method of claim 8, wherein the power harvesting device is a power harvesting RFID tag.

10. The method of claim 8, wherein the reader is an RFID reader.

11. The method of claim 8, wherein the power harvesting device powers the at least one component and queries the at least one component for the component identification information based on an instruction received from the reader.

12. The method of claim 8, wherein the power harvesting device provides the component identification information received from the at least one component to the reader using an antenna coupled to the power harvesting device.

* * * * *